Feb. 24, 1931.                    J. N. WHITE                    1,793,887
              PACKINGLESS COUPLING FOR FLEXIBLE HOSE
                       Filed Jan. 20, 1926
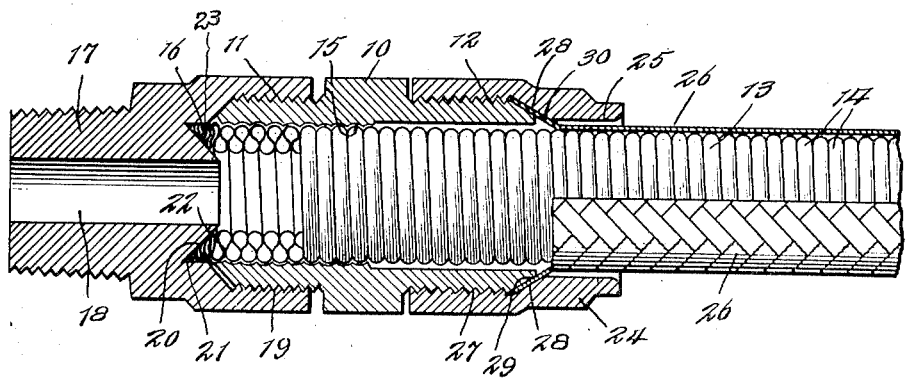
                                              INVENTOR.
                                    Jonathan Newton White
                               BY
                                    Warren S Orton.
                                              ATTORNEY.

Patented Feb. 24, 1931

1,793,887

UNITED STATES PATENT OFFICE

JONATHAN NEWTON WHITE, OF NEW YORK, N. Y., ASSIGNOR TO UNITED METAL HOSE CO., INC., OF NEW YORK, N. Y., A CORPORATION OF NEW YORK

PACKINGLESS COUPLING FOR FLEXIBLE HOSE

Application filed January 20, 1926. Serial No. 82,447.

The invention relates to a pipe connection or coupling adapted to be attached to the end of a flexible hose or pipe for making connection with some other element, and the invention specifically relates to a coupling for making connection with a seamless flexible metal tubing provided with a sheath or covering and which is not necessarily provided with a reinforcing sleeve.

The present disclosure constitutes a companion application with my application filed under even date entitled "Coupling for reinforcing flexible hose" (attorney's file No. 1724).

It has been known in the prior art, as illustrated in the patent to Levitt, No. 1,315,784, September 9, 1919, to thread the end of an inner tubing into a sleeve or barrel element of a coupling, and to provide some suitable form of packing for sealing the connection between the inner tube and parts of the coupling, particularly for sealing the joint between the barrel and the coupling nut or male top usually forming part of the coupling construction. The soft packing usually used in this construction quickly deteriorates when subjected to acids, heat and other service conditions.

Accordingly, one of the objects of the present invention is to provide an improved form of seal for hermetically closing the joints between parts forming the coupling.

Another object of the invention is to provide an improved and easily formed all-metal seal between the coupling and the end of the metallic inner tubing contained in the coupling.

Broadly this phase of the invention is most conveniently formed by designing the relatively movable parts of the coupling in such a way as will cause the parts to distort the contained end of the inner tubing into a jammed sealing fit extending across the joint formed by the distorting parts of the coupling.

In the above indentified Letters Patent it is suggested that the metal braiding encircling the inner tube to be clamped to the inner tubing by a clamping device formed as part of the coupling. This means of clamping the braiding is very apt to distort the circular configuration of the inner tubing and did not always provide for a secure holding of the metal braiding.

Accordingly, another object of the invention is to provide a simplified means for holding the metal braiding independent of its engagement with the contained inner tubing.

Broadly this phase of the invention is attained by providing at one end of the coupling barrel a frusto-conical clutching surface and to thread on to this end of the barrel a clamping or packing nut containing a co-acting clutching face. It is understood that the metal braiding is flared at the end intruded into the coupling and clamped between these two clamping surfaces with any degree of clamping tension desired.

Various other objects and advantages of the invention will be in part obvious from an inspection of the accompanying drawings and in part will be more fully set forth in the following particular description of one form of device embodying the invention, and the invention also consists in certain new and novel features of construction and combination of parts hereinafter set forth and claimed.

In the drawing there is shown a metallic coupling formed solely of three tubular members and including a central sleeve or barrel 10 exteriorly threaded at 11 and 12 adjacent opposite ends. Intruded into the bore of the barrel and projecting from opposite ends thereof is an inner tubing 13, in the instant case shown to be a seamless flexible metal tubing having spiral corrugations 14 threaded into coarse threads 15 formed in the bore for about one half of its length and adjacent one end. The end 16 of the inner tubing 13 which projects beyond the adjacent threaded end of the barrel is disposed so as to be engaged by a coupling nut 17 which telescopes the threaded end 11 of the barrel as is usual in such construction. In the instant case, the male top is provided at its outer end with a relatively small diametered bore 18 and the threaded end is enlarged and interiorly threaded as shown at 19 to engage the threads 11. A shoulder 20 between the reduced and enlarged portions of the bore is provided with a recess 21 forming a re-entrant angle, or differently expressed, forming a frusto-conical nose 22, which is designed to extend into the bore of the inner tubing 13. The male top is screwed into position to force the projecting end 16 of the inner tubing 13 outwardly into a jammed fit against the end of the barrel and against the outlining wall 23 of the recess. Preferably, the projecting end of the inner tube is expanded prior to the positioning of the male top by an expanding tool having the contour of the nose 22.

The other end provided with the threads 12 is engaged by a packing or clamping nut 24 which includes an outer reduced portion 25 having a loose fit about the metal braiding 26 enclosing the inner tube. The bore of the nut 24 has its inner end enlarged and provided with threads 27 to engage the threads 12. The end of the threaded portion of the barrel is provided with a bevelled, frusto-conical seat 29 designed to coact with a similar bevel 28 constituting the shoulder between the reduced and enlarged portions of the bore of the nut 24. The inner end 30 of the metal braiding 26 is spread away from the inner tubing and formed into a flared end fitted between the clamping seats 28 and 29.

In operation it will be understood that the exposed end of the inner tube is threaded into threads 15 provided for the same in the forward end of the barrel with a prescribed length of the inner tubing projecting beyond the barrel. By means of a suitable expanding tool the projecting corrugated end 16 is crushed somewhat into the position and form illustrated. The coupling nut 17 is then screwed into engagement with the adjacent end of the barrel. During the final turning movements the coupling nut is forcibly turned into the position illustrated. This action will cause the intruding nose 22 on the coupling nut to jam the end of the inner tubing into the reentrant angle thus completely closing the joint between the coupling nut and the adjacent end of the barrel. In actual practice this seal becomes so intimately forced against the coupling nut and the adjacent end of the barrel that the line between the seal and these parts is not readily discernible to the naked eye.

An effective seal is thus produced at this point and any tendency to leakage even where high pressures are present in the hose has been eliminated.

The final operation in mounting the coupling to the pipe end is to draw the distended end of the metal braiding about the opposite end of the barrel and on to the frusto-conical nose at 29. The packing nut is then advanced to its limited position shown incidentally clutching the metal braiding between the nut and the barrel. It is understood from this construction that there is provided means for securing the metal braiding to the coupling independent of the means for securing the inner tubing to the coupling and that the braiding can be positively secured between the smooth faces of the clutching device without danger of mutilating the metal braiding and at the same time avoiding any clutching connection with the inner tubing at this point.

While the invention herein has been specifically disclosed in connection with a form of tubing which is not provided with reinforcement it is obviously within the scope of the disclosure to position a reinforcement between the inner tubing and the braiding as is disclosed in the above identified copending application.

Having thus described my invention, I claim:—

1. In a packingless coupling for metal tubing, the combination with a metal tubing, a barrel through the bore of which the tubing is extended and with a portion of the tubing projecting from one end of the barrel, a nut having a relatively small diametered bore enlarged at one end and said enlarged end threaded on said barrel end, said nut provided between the small diametered part and the enlarged part with a recess constituting a reentrant angle with its inner edge entered into the adjacent projecting end of the metal tubing and said nut acting to force said metal tubing end outwardly into sealing engagement with the nut and barrel.

2. Packingless coupling for metallic tubing including a barrel provided with means for securing the tubing thereto with an end of the tubing projecting from the barrel at one end thereof and a coupling nut connected to the barrel at said end and provided with means for distorting the projecting end of the metal tubing into a sealed engagement with the nut and extending across the joint formed between the nut and barrel.

3. In a device of the class described, the combination of a one-piece all-metal tubular barrel constituting an entity externally threaded at one end and provided with a bore threaded at the other end, one end of said barrel being beveled to provide a rigid frusto-conical seat, a metal tubing extending through the bore in threaded engagement with the threaded end of the bore and having a part protruding therefrom beyond said seat, said metal tubing exteriorly of the part in threaded engagement with the barrel bore provided with a metal braiding with its end portion flared outwardly and engaging said seat, a clamping nut having a bore one end portion of which is in threaded engagement with the external threads on the barrel and the other end portion of which extends along and fits loosely about said metal braiding, said nut provided intermediate its end portions with a frusto-conical seat engaging the flared end of the metal braid and coacting with the seat on the end of the barrel to rigidly clamp the flared end of the metal braiding without shifting the same along the metal tubing.

4. In a coupling, the combination of a barrel exteriorly threaded at one end and provided with a bore, a metal tubing extending through the bore in threaded engagement therewith and projecting beyond opposite ends thereof, a nut provided at one end with a relatively small diametered bore and at the other end with a relatively large diametered bore in threaded engagement with the external threads on the barrel, a shoulder at one end of the large diametered bore, said shoulder having an annular recess containing the portion of the inner tubing which projects beyond the adjacent end of the barrel and forming a frusto-conical nose extending into the bore of said projecting tubing and adapted when the nut is screwed onto the barrel to distort and force the projecting end of the inner tubing outwardly into a jammed fit against the adjacent end of the barrel and against the outlining wall of the recess thereby to form an all-metal seal for the joint between the nut and adjacent end of the barrel.

5. In a coupling, the combination of a barrel, a metal tubing with its major portion having spiral corrugations and secured thereby in threaded engagement with the barrel and having an irregularly corrugated portion projecting beyond the barrel, a nut in threaded engagement with the barrel, said nut provided with a frusto-conical nose intruded into the bore at one end of the tubing, bearing firmly on the same and holding the projecting irregularly corrugated portion of the same in distended position, said nut provided with an annular recess containing said distended and projecting end of the tubing and substantially filled thereby, and the projecting portion of said tubing contained in said recess being distorted and reduced in length from its normal spiral corrugated form, held in said recess by said nose and forming a metal seal between the barrel and nut.

Signed at New York, in the county of New York, and State of New York this 14th day of January, A. D. 1926.

JONATHAN NEWTON WHITE.